United States Patent [19]
Kraker et al.

[11] Patent Number: 5,099,234
[45] Date of Patent: Mar. 24, 1992

[54] SWITCHING MATRIX NETWORK FOR DIGITAL AUDIO SIGNALS

[75] Inventors: Alfred Kraker, Vienna; Guenter Neuhold, Bruck/L.; Raimund Mitterbauer, St. Polten; August Kicker, Vienna, all of Austria

[73] Assignee: Siemens Aktiengesellschaft Osterreich, Austria

[21] Appl. No.: 457,813

[22] PCT Filed: May 11, 1989

[86] PCT No.: PCT/EP89/00515
§ 371 Date: Mar. 9, 1990
§ 102(e) Date: Mar. 9, 1990

[87] PCT Pub. No.: WO89/11188
PCT Pub. Date: Nov. 16, 1989

[30] Foreign Application Priority Data
May 11, 1988 [AT] Austria ................. 1234/88

[51] Int. Cl.$^5$ ............... H04Q 11/04; H04L 25/36; H04J 3/06; H04H 7/00
[52] U.S. Cl. .................. 340/725.79; 340/825.7; 370/58.1; 375/119
[58] Field of Search .......... 340/825.79, 825.8, 825.7, 340/825.71, 825.74, 825.14, 825.2; 375/111, 119; 370/58.1, 58.2, 58.3, 61, 110.1

[56] References Cited
U.S. PATENT DOCUMENTS

| | | | |
|---|---|---|---|
| 3,868,481 | 2/1975 | Patrusky et al. | 370/84 |
| 4,639,910 | 1/1987 | Toegel et al. | 370/58.1 |
| 4,808,008 | 2/1989 | Guerillot | 375/118 |
| 4,841,548 | 6/1989 | Volejnik | 375/119 |
| 4,894,821 | 1/1990 | Hayano | 370/58.1 |

FOREIGN PATENT DOCUMENTS

| | | |
|---|---|---|
| 0076505 | 4/1983 | European Pat. Off. . |
| 0251854 | 1/1988 | European Pat. Off. . |
| 3511352 | 3/1985 | Fed. Rep. of Germany . |
| 3511352 | 10/1986 | Fed. Rep. of Germany . |
| 1479313 | 7/1977 | United Kingdom . |

Primary Examiner—Donald J. Yusko
Assistant Examiner—Peter Weissman
Attorney, Agent, or Firm—Hill, Van Santen, Steadman & Simpson

[57] ABSTRACT

A switching matrix network provide switching of digital signals of different sampling frequencies by sampling the digital signals at a sampling frequency greater than any digital input signal and generating an interference signal as a measure of the phase difference or the frequency difference between the sampling frequency and the digital input signal using an input intermediate memory chain. The interference signals are transmitted in coded form through the switching matrix during sampling periods not occupied by data. The original input signal is regenerated at the output of the switching matrix from the interference signal using an output intermediate memory chain and clock regenerating circuits.

2 Claims, 2 Drawing Sheets

FIG. 3A  (f_i) 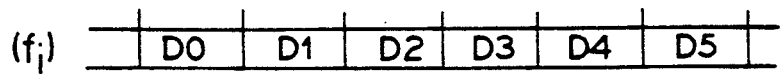
FIG. 3B  (f_x) 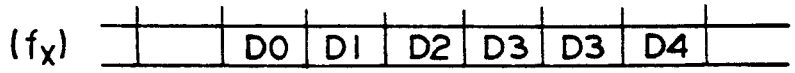

FIG. 3D  (SP) 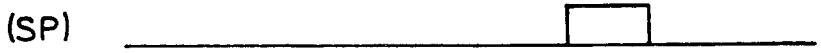
FIG. 3E  (K&SP) 

FIG. 4
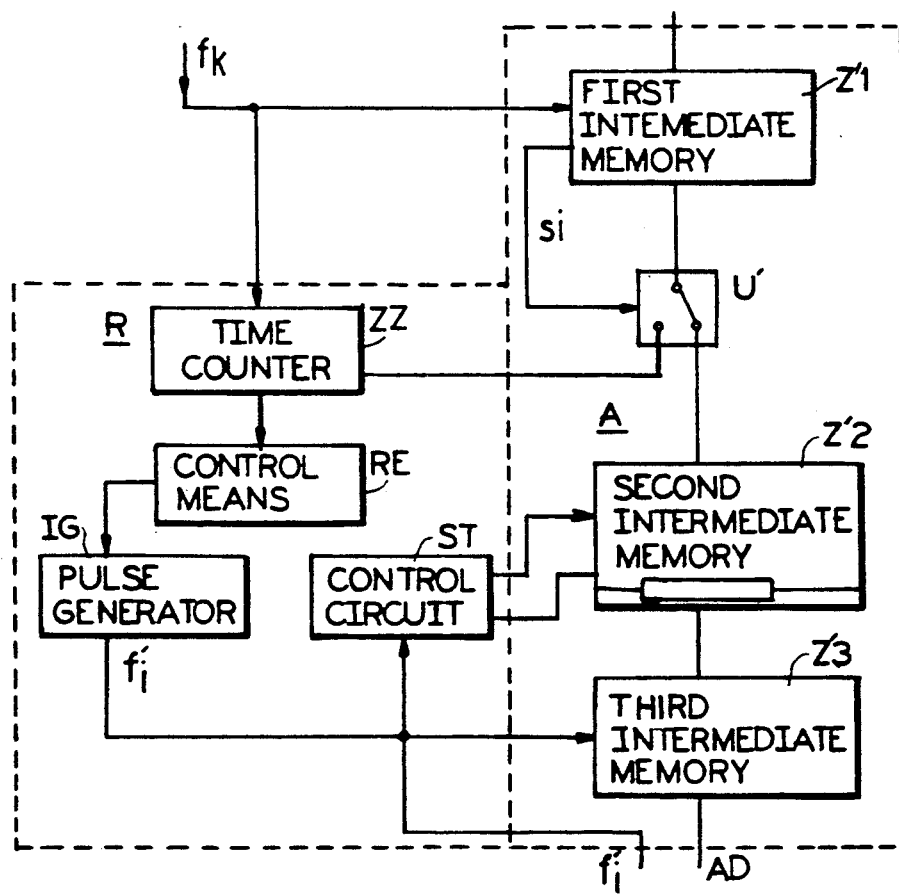

SWITCHING MATRIX NETWORK FOR DIGITAL AUDIO SIGNALS

BACKGROUND OF THE INVENTION

3. Field of the Invention

The invention is directed to a switching matrix network for digital audio signals that are supplied to the inputs of the switching matrix network in parallel representation via incoming data busses in individual sampling clock sequences having sampling frequencies that deviate from one another and are transmitted in identical parallel representation to identical, outgoing data busses via arbitrarily switchable outputs of the switching matrix network, whereby a suitable switching matrix network sampling clock is provided for the switching events within the switching matrix network.

2. Description of the Related Art

It can occur in switching equipment for digitized audio signals in the sound recording studio field that the PCM signals at the inputs of the switching matrix network have different sampling rates. This particularly leads to problems when the couplers had a fixed sampling rate prescribed for them. In systems having a great number of channels, it seems beneficial to use the same coupler for all channels, since, thus, the hardware outlay for the actual switching matrix network can be kept low in comparison to a plurality of sub-couplers having differing "switching rates". The object thus arises to exactly maintain the sampling rate when coupling pulse-code-modulated signals, i.e. that the individual sampling frequency with which a signal is supplied to the input of the switching matrix network should also be preserved in the signal taken from the respectively coupled output. If, namely, the sampling rates were to vary within shorter time intervals, then this would involve a deterioration of the quality of the signal reconstructed after the digital-to-analog conversion.

U.S. Pat. No. 3,868,481 discloses a time-division multiplex through-connect system (switching matrix network) for digital signals that works with different bit rates that derive due to different word lengths (6 or 8 bits per byte) and different combinations of channels (or words) of 6, 12 or 24 channels per frame. In this system, however, the sampling rate for all channels is the same, this, of course, being a prerequisite for these channels to be capable of being combined to form a higher-ranking channel (highway). The incoming signals are converted by input units to a uniform byte and frame format that is then offered to the switching matrix network.

The sampling rate of the outgoing signals is synchronous with the coupler clock multiplied by a rational factor. This must be appropriately selected in order to be able to switch the total of signals sampled with, for example, 8 kHz. A periodic data loss that is compensated by resetting buffer memories (elastic buffers) arises due to slight frequency differences. The system disclosed by the U.S. Patent is not suitable for signals having input sampling frequencies that deviate greatly from one another, as is possible in the switching matrix network of the invention.

SUMMARY OF THE INVENTION

The object of the invention is to produce the switching of audio signals with different sampling rates with the assistance of a single switching matrix network having minimum outlay. This is inventively achieved in that, for the purpose of achieving a coincidence of the sampling clock sequences at the outputs of the switching matrix network and those at the respectively allocated inputs of the switching matrix network, the switching matrix network sampling clock has a sampling frequency that is greater than all individual sampling frequencies, and in that, first, a respective input intermediate memory chain is provided at the switching matrix network inputs and has a respective, allocated clock comparison circuit for acquiring a respective interference signal that is a measure for the phase difference or, respectively, frequency difference between the individual sampling frequency and the sampling frequency of the switching matrix network, whereby the interference signals are transmitted in coded form during the sampling periods of the switching matrix network that are not required for the transmission of audio data, these sampling periods deriving as a consequence of the sampling frequency of the switching matrix network that is elevated in comparison to all individual sampling frequencies; and in that, on the other hand, a respective clock regeneration circuit is provided at the switching matrix network outputs, serving for the recovery of the respective, individual sampling frequency, controlled dependent on the allocated interference signal and each having an allocated output intermediate memory chain; and in that the interference signals from the clock comparison circuits are coupled into the data flows at the allocated switching matrix network outputs in coded form, being coupled in at the appertaining switching matrix network inputs and, after being coupled out of the data flows at the switching matrix network outputs, are supplied to the clock regeneration circuits there.

The switching principle employed in the circuit of the invention produces the necessity of intermediately storing all data (including the interference signals) deriving from the inputs and already synchronized with the sampling frequency of the switching matrix network during a switching matrix network sampling period and of supplying the switching matrix network outputs with the corresponding data in the same time interval. Conforming to a further feature of the invention, this is achieved in that the memory locations provided for the intermediate storage of the data within the switching matrix network are executed allocated to one another as pairs of memory locations whose memory locations are occupied in alternation with the data of successive sampling periods such that the data of the current sampling period are written into the one memory location of a pair of memory locations whereas the data of the preceding sampling period are simultaneously read out from the other, allocated memory location. The functions of the two memory locations are interchanged after every switching matrix network sampling period, so that the continuity of input and output is preserved and, further, a time saving of 50% can be achieved in comparison to an execution having respectively separate memory locations or, respectively, a doubling of the possible number of channels can be achieved given the same duration of the switching matrix network sampling period.

BRIEF DESCRIPTION OF THE DRAWINGS

As an exemplary embodiment of the invention, FIG. 1 of the drawing schematically shows a switching matrix network KF with the circuits provided at its inputs and outputs. FIG. 4 shows the structure of one of the circuits provided at the switching matrix network outputs.

DETAILED DESCRIPTION OF THE PREFERRED EMBODIMENTS

Figure 1:
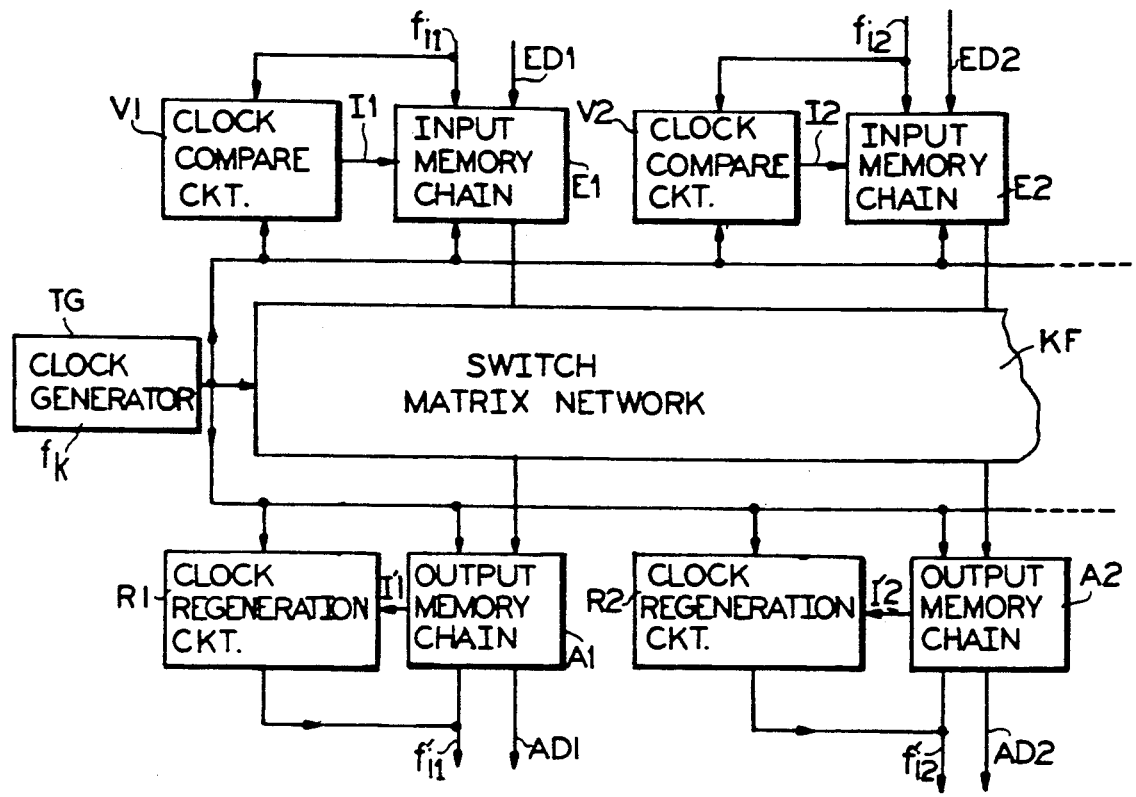

The switching matrix network KF serves the purpose of producing arbitrary connections between a respective switching matrix network input and a respective switching matrix network output. Of these, only respectively two inputs and two outputs are shown in FIG. 1. The input signals are supplied binarily coded in parallel representation with an individual sampling frequency $f_{i1}$, $f_{i2}$ . . . , being supplied by the analog-to-digital converters (not shown in the drawing) via, for example, 20 bit input data busses ED1, ED2 . . . The input data busses ED1, ED2 . . . , just like the output data busses AD1, AD2 . . . , are each shown by a heavy, solid line and by a light, solid line. The heavy, solid lines thereby symbolize the line groups that transmit the coded data, whereas the light, solid lines respectively show an individual line via which a sampling clock appertaining to the coded data and having the individual sampling frequencies $f_{i1}$, $f_{i2}$ is transmitted to the illustrated, two first inputs. Data deriving from any other inputs are transmitted by the switching matrix network KF to the two first outputs with their individual sampling frequencies $f'_{i1}$, $f'_{i2}$. The numerical indices at the designations for the sampling frequency refer only to the numberings of the inputs and, respectively, outputs. The prime in $f'_i$ denotes that the appertaining frequencies are taken at the outputs.

A centrally controlled, common switching of all input signals occurs within the switching matrix network, which would not be possible given preservation of the individual sampling frequencies $f_{i1}$. . . of the individual input signals. Accordingly, the input signals are converted at the switching matrix network inputs from their individual sampling frequency $f_{i1}$, $f_{i2}$ . . . to identically coded signals that have a switching matrix network sampling frequency $f_k$ that is uniform for the entire switching matrix network KF. The signals switched via the switching matrix network KF are converted back to the original sampling frequencies $f'_{i1}$, $f'_{i2}$ . . . at the switching matrix network outputs.

Memories executed as pairs of memory locations whose memory locations are occupied in alternation with the data of successive sampling periods are provided for the intermediate storage of the data within the switching matrix network KF. The procedure in the memory occupations is such that the data of the present sampling period are written into the one memory location of a pair of memory locations while the data of the preceding sampling period are simultaneously read out of the other, allocated memory location. During the next sampling period, the functions of the two memory locations are changed.

The conversions of the individual sampling frequencies $f_{i1}$ . . . into the switching matrix network sampling frequency $f_k$ at the switching matrix network inputs and the back-conversions into the individual sampling frequencies $f'_{i1}$ . . . at the switching matrix network outputs shall be set forth below with reference to FIG. 1:

a respective input intermediate memory chain E1, E2 to which a respective clock comparison circuit V1, V2 . . . is allocated is provided at every switching matrix network input. The input signals supplied from various analog-to-digital converters (not shown in the illustration) via the input data busses ED1, ED . . . in part have extremely different sampling frequencies $f_{i1}$, $f_{i2}$ . . . Each of the input intermediate memory chains has three digital memories. The appertaining data information is rolled into the first memory Z1 at each of the sampling clocks in-coming with the individual frequency $f_{i1}$, $f_{i2}$ . . . At the same time, the individual sampling clock $f_{i1}$, $f_{i2}$ . . . is compared in the allocated clock comparison circuit V1, V2 . . . to the switching matrix network sampling clock $f_k$ that is generated in a clock generator TG. Since the switching matrix network sampling frequency $f_k$ is higher than any even possible individual sampling frequency $f_{i1}$, $f_{i2}$, only frequency deviations having one operational sign arise and these are imaged by an interference signal I1, I2 . . . The data input in the first intermediate memory Z1 are transferred to a second intermediate memory Z2 from which they are read in the clock of the switching matrix network sampling frequency $f_k$. As shall be set forth later with reference to FIG. 2, a third intermediate memory Z3 serves the purpose of inserting the interference signals that are likewise represented in binarily coded form into the data stream. In addition to the useful information, every data stream switched from a switching matrix network input to a switching matrix network output thus additionally contains an information conducted over additional transmission cycles about the individual sampling frequency of the input signal in the form of the interference signal I1, I2 . . . that provides information about the frequency difference and/or phase relation of the individual sampling clocks $f_{i1}$, $f_{i2}$ . . . relative to the switching matrix network sampling clock $f_k$.

The interference signal I1, I2 . . . that derives from the respectively connected input signals is coupled out of the data flows at the switching matrix network outputs and is utilized for the regeneration of the appertaining, individual sampling clock of the input signal. To this end, a respective output intermediate memory chain A1, A2 . . . together with a clock regeneration circuit R1, R2 . . . is also provided at the switching matrix network outputs. The data stream coming from the respectively connected switching matrix network input is written into a first intermediate memory Z'1 with the switching matrix network sampling frequency $f_k$, as shall be set forth in detail later with reference to FIG. 4. The interference signal I'1, I'2 . . . is read out there and is supplied to the appertaining clock regeneration circuit R1, R2 . . . that is provided with a controllable pulse generator that, with the assistance of the interference signal, is set to generating the corresponding, individual sampling frequency $f'_{i1}$, $f'$ . . . with which, first, the useful information is read out from the last intermediate memory of the output intermediate memory chain A1, A2 . . . and is supplied into the appertaining output data bus AD1, AD . . . On the other hand, the sampling pulses having the frequencies $f'_{i1}$, $f'_{i2}$ . . . are supplied to the corresponding lines of the output data busses as accompanying pulses for the output data.

Figure 2:
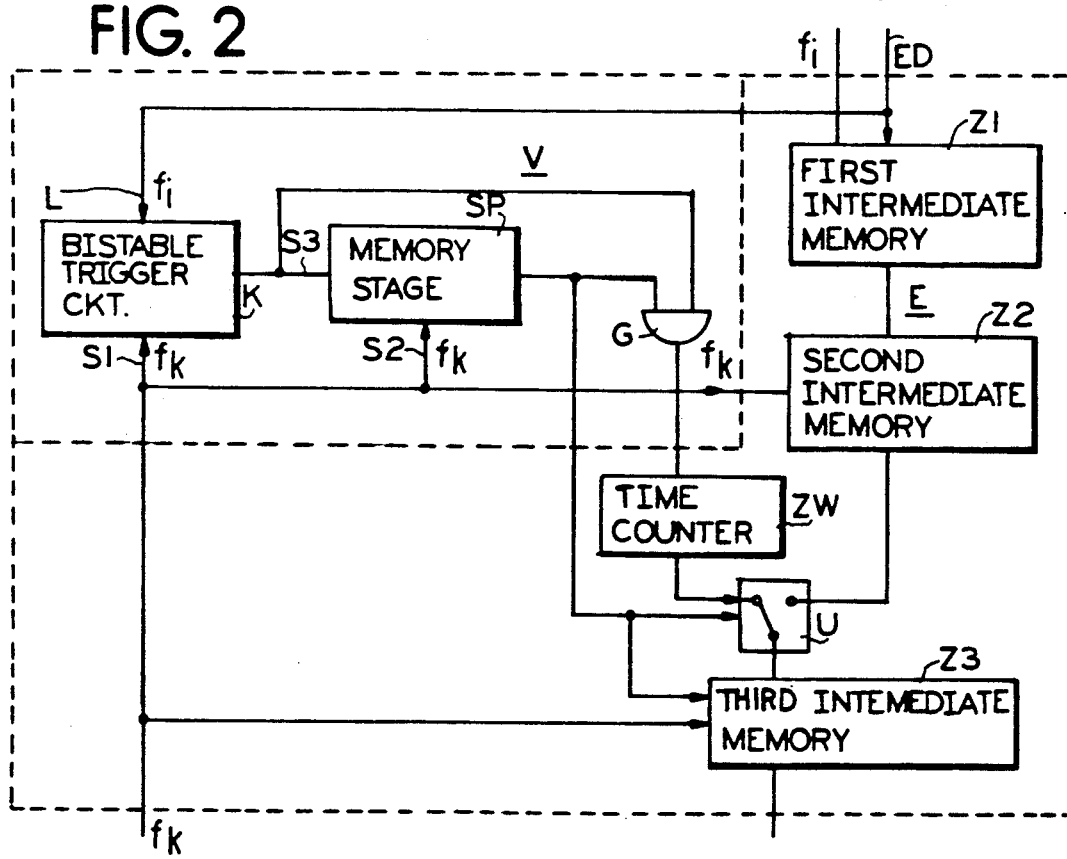
FIG. 2 shows a detailed view of the structure of one of the circuits provided at the switching matrix network inputs, whereby a pulse diagram required for an understanding of the function of this circuit is shown in FIG. 3a through 3f.
Figure 3C:
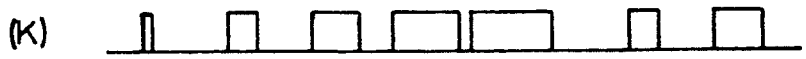
Figure 3F:
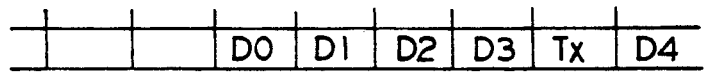

FIG. 2 shows the specific design of an intermediate memory chain E together with allocated clock comparison circuit V, each of which is bounded by dotted lines, provided at a switching matrix network input. The input signal offered via the incoming input data bus ED is written into a first intermediate memory Z1 of the input intermediate memory chain E with the individual sampling clock $f_i$. Simultaneously, the individual sampling clock $f_i$ is supplied to the clock comparison means V in which a bistable circuit K has its reset input L charged by the pulses of the sampling clock $f_i$. The clock comparison means V is further supplied with the pulses generated by the clock generator TG having the switching matrix network sampling frequency $f_k$ and the setting inputs S1 or, respectively, S2 of the trigger circuit K and of a memory stage SP are also charged with this frequency $f_k$. Further, the memory content of the first intermediate memory Z1 is written into the second intermediate memory Z2 with the switching matrix network sampling frequency $f_k$. The memory stage SP also has a second setting input S3 that is connected to the output of the trigger circuit K. The memory stage SP is only set when a signal is adjacent both at the setting input S2 as well as at the setting input S3, i.e. when a sampling pulse of the clock generator TG arrives and when the trigger circuit K is set at the same time. The outputs of the trigger circuit K and of the memory stage SP are connected to the inputs of an AND gate G whose output leads to a time counter ZW that is activated during the duration of an output pulse at the gate G and supplies binarily coded time signals at its output whose quantization frequencies are independent of the switching matrix network sampling frequencies and that derive from local crystal generators of identical frequency. A switch-over means controlled dependent on the output signal of the memory stage SP is referenced U, this switch-over means, when actuated, interrupting the data flow from the second intermediate memory Z2 to a third intermediate memory Z3 and instead connecting the input of the intermediate memory Z3 to the output of the time counter ZW.

The fact that the switching matrix network sampling frequency $f_k$ is higher than each of the individual sampling frequency $f_i$ means that there is a whole number n of sampling periods incoming at the input with the period duration $f_i^{-1}$ for each of these individual sampling frequencies $f_i$ whose overall duration is approximately the same as the overall duration of a plurality of (n+1) switching matrix network sampling periods each having a period duration of $f_k^{-1}$. That case wherein a switch sampling period entirely lies within an input sampling period is always referred to as "coincidence" of a switching matrix network sampling period with an input sampling period. The expression "coincidence" is placed between quotation marks because it does not identify a mathematically exactly defined position between the sampling periods, for a switching matrix network sampling interval can be situated in different temporal positions within an input sampling interval, this temporal position being measured as a time difference between the concluding sampling pulse of a switching matrix network sampling interval lying within an input sampling interval and the following input sampling pulse. With every sampling cycle composed of respectively n input sampling periods or, respectively, respectively (n+1) switching matrix network sampling periods, i.e. at every "coincidence", this time difference characterizing the phase relation between the concluding switching matrix network sampling pulse and the following input sampling pulse is converted into a coded interference signal. Since respectively (n+1) switching matrix network sampling periods devolve onto respectively n input sampling periods, a transmission capacity through the switching matrix field that is elevated in comparison to the input data stream derives for the signal transmission within the switching matrix network KF, this increased transmission capacity being then inventively utilized for transmitting the coded interference signals I1 ... from a switching matrix network input to the respectively through-connected switching matrix network output. Since respectively one additional switching matrix network sampling period that is not required for the data transmission itself is available at every sampling cycle of respectively n input sampling periods, this additional sampling period is utilized for the transmission of the coded interference signal and is marked as a sampling period serving the purpose of transmitting the interference signal, being marked by an additional data bit referenced "si".

How this occurs in detail shall be set forth below with reference to FIG. 2 and further reference to the diagrams of FIGS. 3a through 3f.

The first diagram referenced in FIG. 3a shows the input sampling pulses having the frequency $f_i$; the respectively current data word is present at the incoming input data bus ED in the time interval between two respectively successive sampling pulses. Some of these data words are symbolized by the references D0 ... D5. These, thus, are retrieved with the frequency $f_i$ from the input data bus ED and are rolled into the first intermediate memory Z1. The second diagram referenced FIG. 3b shows the pulses with the switching matrix field sampling frequency $f_k$ that are generated by the clock generator TG. The data D0 ... written in the first intermediate memory Z1 are read out with this frequency $f_k$ and are written into the second intermediate memory Z2. The shift of the presence of the data D0... in the intermediate memories Z1 and Z2 that may be seen by comparing the diagrams "a" and "b" thereby derives.

The trigger circuit K is set via its setting input S1 with every switching matrix sampling pulse ($f_k$) and the trigger circuit K is reset via the reset input A with every input sampling pulse ($f_i$) following thereupon. The pulse diagram FIG. 3c resulting at the output of the trigger circuit K is shown as the third pulse diagram in. As long as the pulses having the individual sampling frequency $f_i$ and the pulses having the switching matrix network sampling frequency $f_k$ arrive in alternating sequence, no output signal of the trigger signal K that lasts longer than a sampling period arises, since, although it is set with every switching matrix network sampling pulse, it is again reset within every sampling period. The memory stage SP is set only when a switching matrix network sampling period lies entirely in a sampling period of the input signal, since a signal is simultaneously adjacent at both its inputs S2 and S3. The memory stage SP remains set until the next switching matrix network sampling pulse arrives via the input S2, this resetting the memory stage SP. This is shown in diagram of FIG. 3d. By actuating the switch-over means U, the time counter ZW is connected to the input of the third intermediate memory Z3 during this time, this time counter ZW—as already mentioned—supplying an interference signal during the coincidence time of the output signals of the trigger circuit K and of the memory stage SP (shown in diagram of FIG. 3e) that characterizes the duration of the coincidence time and that remains applied during the duration of the connection of the time counter ZW to the intermediate memory Z3 at the input thereof and thus transmits the time difference between the two sampling pulse frequencies $f_i$ and $f_k$ to the allocated switching matrix network output with the interference signal, transmitting this at every sampling cycle during the last period of the sampling periods of the switching matrix network that are incremented by 1 in comparison to the plurality of the input sampling periods. A sampling sequence that has arisen in such fashion is shown in diagram in FIG. 3f in which the sampling interval serving for the transmission of the interference signal is referenced Tx.

FIG. 4, finally, shows the circuit for a switching matrix network output. This circuit is composed of an output intermediate memory chain A and of a clock regeneration circuit R. The data incoming via the switching matrix network are read into a first intermediate memory Z'1 in the clock of the switching matrix network sampling frequency $f_k$, the output of this first intermediate memory Z'1 being connected during the data transmission to a second intermediate memory Z'2 acting as buffer memory. During every sampling interval Tx that serves for the transmission of the interference signal, by contrast, the switch-over means U' is actuated in such fashion with the signal si acquired from the intermediate memory Z'1 that it connects the output of the intermediate memory Z'1 to the input of a time counter ZZ situated in the clock regeneration R that, activated by a switching matrix network sampling pulse, decodes the data word adjacent during the sampling interval Tx appertaining to the respective interference signal and supplies a corresponding signal to a control means RE for a pulse generator IG that has a controllable frequency $f'_i$. Since the interference signal supplies the pulse generator both with a frequency information about the input sampling frequency $f_i$ as well as with a phase information about the phase difference between the input sampling pulses on the one hand and the switching matrix network sampling pulses on the other hand at the end of every sampling cycle, an exact control of the pulse generator IG is possible which thus effects that the pulses of the pulse generator IG having the frequency $f'_i$ practically coincide with the input sampling pulses having the frequency $f_i$.

ST references a control circuit for the buffer memory Z'2 that effects a conversion of the data supplied from the intermediate memory Z'1 with the switching matrix network sampling frequency $f_k$ into data that are offered with the reconstructed, individual sampling frequency $f'_i$. Via a further intermediate memory Z'3, finally, the reconstructed data are output to the output data bus AD.

Although other modifications and changes may be suggested by those skilled in the art, it is the intention of the inventors to embody within the patent warranted hereon all changes and modification as reasonably and properly come within the scope of their contribution to the art.

We claim:

1. A switching matrix network for digital audio signals that are supplied to switching matrix network inputs in parallel representation in individual sampling clock sequences having mutually deviating sampling frequencies and via in-coming data busses and are transmitted in the same parallel representation to identical, outgoing data busses via arbitrarily switchable switching matrix network outputs, comprising:

a separate switching matrix network sampling clock means for switching events within the switching matrix network for achieving a coincidence of sampling clock sequences at the switching matrix network outputs with those at the respectively allocated switching matrix network inputs, the switching matrix network sampling clock means has a sampling frequency that is higher than all individual sampling frequencies of the digital audio signals;

a respective input intermediate memory chain each having a respectively allocated clock comparison circuit is provided at the switching matrix field inputs for the acquisition of a respective interference signal that is a measure of phase difference or, respectively, frequency difference between individual sampling frequency and the switching matrix network sampling frequency, said input intermediate memory chain being connected to transmit the interference signals through the switching matrix in coded form during switching matrix network sampling periods not required for transmission of audio data that derive as a consequence of the switching matrix network sampling frequency that is elevated in comparison to all individual sampling frequencies;

a respective regeneration circuit each having a respectively allocated output intermediate memory chain is provided at the switching matrix network outputs, serving for recovery of the respective, individual sampling frequency and controlled dependent on the allocated interference signal; and in that the interference signals are coupled from the clock comparison circuits at the appertaining switching matrix field inputs into the data flows to the allocated switching matrix network outputs in coded form and, after being coupled out of the data flows at the switching matrix network outputs, are supplied there to the clock regeneration circuits.

2. A switching matrix network according to claim 1, memory locations in said input intermediate memory chain and in said output intermediate memory chain provided for intermediate storage of the data within the switching matrix network are executed as pairs of memory locations allocated to one another whose memory locations are occupied with the data of successive sampling periods in alternation such that the data of the current sampling period are written into the one memory location of a pair of memory locations while the data of the preceding sampling period are simultaneously read from the other, allocated memory location.

* * * * *